United States Patent [19]
Davidson

[11] Patent Number: 6,133,843
[45] Date of Patent: *Oct. 17, 2000

[54] MODULAR MOUNTING PLATE

[75] Inventor: Curtis R. Davidson, Oswego, Ill.

[73] Assignee: Pittway Corporation

[*] Notice: This patent is subject to a terminal disclaimer.

[21] Appl. No.: 08/953,122

[22] Filed: Oct. 17, 1997

Related U.S. Application Data

[63] Continuation-in-part of application No. 08/838,002, Apr. 14, 1997, Pat. No. 5,914,665.

[51] Int. Cl.⁷ .................................................. G08B 23/00
[52] U.S. Cl. ...................... 340/693.9; 340/691.1; 340/693.11; 174/48; 174/49; 174/50
[58] Field of Search ............................. 340/691.1, 282.1, 340/693.9, 693.11, 517, 331, 332; 174/48, 49, 50, 66; 362/147, 368; 439/535, 536

[56] References Cited

U.S. PATENT DOCUMENTS

| | | | |
|---|---|---|---|
| 4,315,594 | 2/1982 | Niederost | 340/693.11 |
| 5,135,411 | 8/1992 | Wiley et al. | 439/535 |
| 5,598,139 | 1/1997 | Karim et al. | 340/286.11 |
| 5,602,522 | 2/1997 | Pacelli | 340/331 |
| 5,684,467 | 11/1997 | Hur | 340/693.9 |
| 5,773,760 | 6/1998 | Stark et al. | 174/66 |
| 5,914,665 | 6/1999 | Thorp et al. | 340/691.1 |
| 5,969,627 | 10/1999 | Tarlton et al. | |

OTHER PUBLICATIONS

Wheelock brochure, "Alarm Signals For Industrial Safety And Communication" (10 pages).
American Security Equipment Company brochure FSL1–1–12 & FSL1–1–24 Electronic Sounder/Strobe Combination (2 pages).
American Security Equipment Company "SL–3 Fire Alarm Stobe Light" (2 pages).
Gentex brochure "710CS/710LS Single Station 120 VAC Photoelectric Smoke Detector . . . " (2 pages).
Gentex brochure "GX Series" (2 pages).
FCI brochures, Bulletins S–340/0481, S–300/0182 and S–341/0487 (3 pages).
System Sensor brochure "Installation Instructions For Models: MA–12/241 Electronic Sounder, SS–12, SS–24 Electronic Strobe, MA/SS–121, MA/SS–241 Sounder/Strobe Combined" (4 pages) 1990.

*Primary Examiner*—Benjamin C. Lee
*Attorney, Agent, or Firm*—Rockey, Milnamow & Katz

[57] ABSTRACT

A plastic mounting plate closes a junction box which delivers wires to an alarm unit or emergency light or the like. The mounting plate is connected to the junction box by screws which engage threaded holes provided by the junction box. The mounting plate can be mounted to either a single-wide junction box or a double-wide junction box and provides corresponding holes for connection to either box. An alternate mounting plate for a single-wide junction box is also provided. An alarm device can be connected to the mounting plate directly by screws or by a combination of a single screw and a tab which is received into a slot onto the mounting plate. The mounting plate can be color-coded for a particular alarm service, such as fire, weather warnings, or other emergency condition.

33 Claims, 8 Drawing Sheets

MODULAR MOUNTING PLATE

This application is a continuation-in-part of U.S. Ser. No. 08/838,002, filed Apr. 14, 1997, and now issued as U.S. Pat. No. 5,914,665.

FIELD OF THE INVENTION

The present invention relates to alarm units and associated devices which mount to electrical boxes. More particularly, the present invention relates to a mounting plate for attaching an alarm unit module to either a recessed or surface mounted electrical junction box.

BACKGROUND OF THE INVENTION

For purposes of safety and security, alarm or security related electric devices can be positioned throughout a building or structure. The devices can constitute detectors such as smoke detectors, or can be annunciators such as audible fire and security alarms, or can include emergency lights.

The detectors can include motion detectors or other intruder alarms. Additionally, other local area monitoring devices which sense an ambient condition or provide a local alarm can be mounted at locations throughout a building or other structure.

In the case of a building having unfinished walls, such as a warehouse, such devices are typically attached to surface mounted electric wire junction boxes. These boxes are connected by surface mounted conduits to a central location. The conduits carry signal wires between the central location and the local electrical device, such as the alarm unit or detector.

The alarm units are typically installed by two screws which engage standard screw holes provided on top and bottom sides of the open face of a respective junction box. Although such mounting may be adequate to support the alarm unit, it would be desirable to provide a mounting plate which integrates the alarm unit and the respective junction box into a unitary appearing mounting configuration. It would be desirable to provide a mounting plate which, by its presence on the junction box, designates the junction box as being dedicated to a particular safety or security system. It would also be desirable to provide a mounting plate which is installable at either a single or double wide junction box without leaving gaps between the mounting plate and the junction box.

SUMMARY OF THE INVENTION

The mounting plate of the present invention is attachable to a wall recessed junction box or a surface mounted junction box. When mounted to a recessed junction box, the junction box is effectively concealed. The mounting plate can be provided in alternate embodiments including a larger mounting plate for covering either a single or double wide junction box; or a smaller mounting plate particularly suited for a single wide junction box. The mounting plates are significantly oversized when compared to an open face of either junction box.

An attachment arrangement incorporating screws or other fasteners is provided for connecting the mounting plate to the standard mounting screw holes available in a junction box. The mounting plate provides an easy mounting arrangement for an alarm unit or other electrical device to be attached thereto.

The mounting plate is advantageously designed to mount an alarm unit, or other electrical device onto the junction box and to present a unitary appearance therewith. When so mounted onto a wall recessed junction box, the junction box is not visible.

The mounting plate of the present invention is formed as a onepiece, molded plastic structure. The mounting plate can be color coded for type of service, such as a very visible red or yellow fire-alarm color for fire protection or alarm devices. Additionally, different colors can represent different emergency situations. For example, red alarm mounting plates can be allocated for fire alarms, green alarm mounting plates can be allocated for tornado warnings, and blue alarm mounting plates can be allocated for a "take cover immediately" warning. Other colors can be allocated for warning of the presence of excessive concentrations of toxic or explosive gas, or other emergency situations.

The invention also encompasses a mounting plate which can interchangeably receive either an audible alarm unit or an emergency strobe light, or a combination of the two services. Alternate types of modules can also be attached.

The mounting plate can include a slot and screw hole arrangement for easy attachment of a compatibly fashioned unit or module which provides a tab received into the slot and a screw engaged by the screw hole. This arrangement provides for a quick and easy installation or exchange of an alarm unit, emergency light or other electrical device onto a pre-installed mounting plate. Additionally, the screws which connect the mounting plate to the junction box can be covered by the respective alarm unit, or emergency light, thereby improving the overall appearance of the assembly.

In addition to being architecturally appealing, the mounting plate is also functional. When the alarm unit or emergency light is removed from the mounting plate, the mounting plate provides an enclosure and protection to signal wires located within the otherwise open junction box.

Also, unlike the relatively smaller junction box, the mounting plate provides a mounting surface which is larger than the alarm unit mounted thereto which provides a stable and secure mounting arrangement. Once installed onto the mounting plate, no portions of the alarm unit overhang the mounting plate. This arrangement avoids an exposed edge vulnerable to prying the alarm unit off the junction box by vandals. When installed onto recessed junction box the relatively oversized mounting plate covers a greater expanse of wall so that a rougher and larger wall opening around the junction box can be covered. This is particularly advantageous for retrofitting walls with junction boxes for alarm service.

While the alarm unit or emergency light is being exchanged, tested, or during construction, the conduit and junction box is clearly designated as dedicated to signal wires for alarms to reduce any confusion between signal conduits and signal junction boxes and electrical power conduits and electrical power junction boxes. In this way, the alarm system components can be more clearly demarcated.

In addition to screws, in an alternate embodiment, the mounting plate can be attached using other types of fasteners. In this regard, snap-fit fasteners can be used.

Other features and advantages of the present invention will become readily apparent from the following detailed description, the accompanying drawings, and the appended claims.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Figure 1:
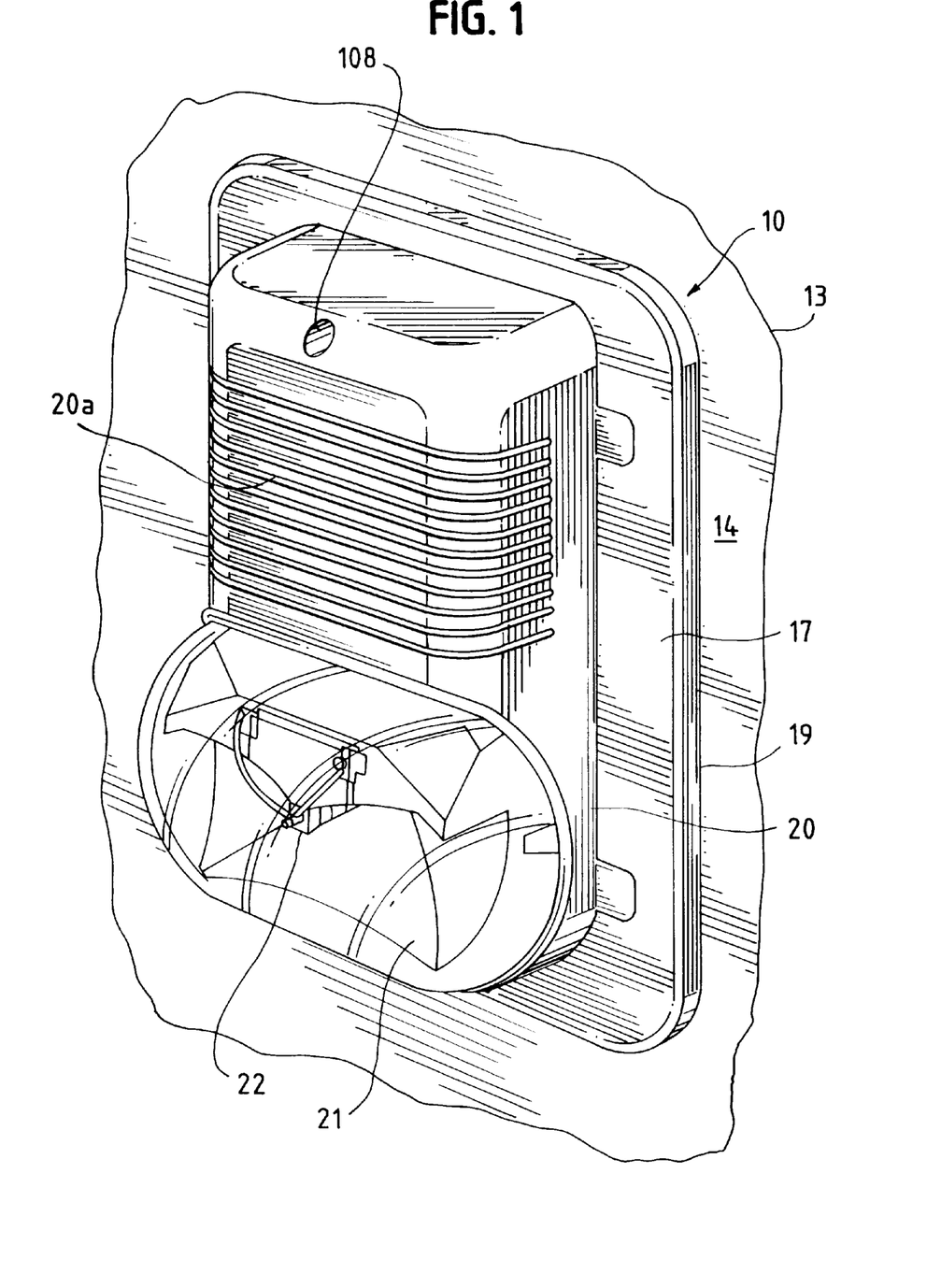
FIG. 1 is a perspective view of a mounting plate installed on a wall recessed junction box.

FIG. 1 illustrates an alarm unit assembly 10 installed onto an electrical junction box 12 (shown in FIG. 2) which is recessed into a wall 13 from a wall surface 14. The junction box is connected by a conduit 16 having signal wires therein delivered into the junction box.

A mounting plate 17 is connected to the junction box. The mounting plate has a surrounding edge 19 which is adjacent to the wall surface 14.

A strobe light alarm unit 20 is mounted to the mounting plate 17. The alarm unit includes a lens 21 covering a lamp 22. In the illustrated embodiment, the strobe light alarm unit also includes an audible alarm 20a, in addition to the strobe light lamp 22 for audible signaling of an alarm condition.

Figures 2, 2A:
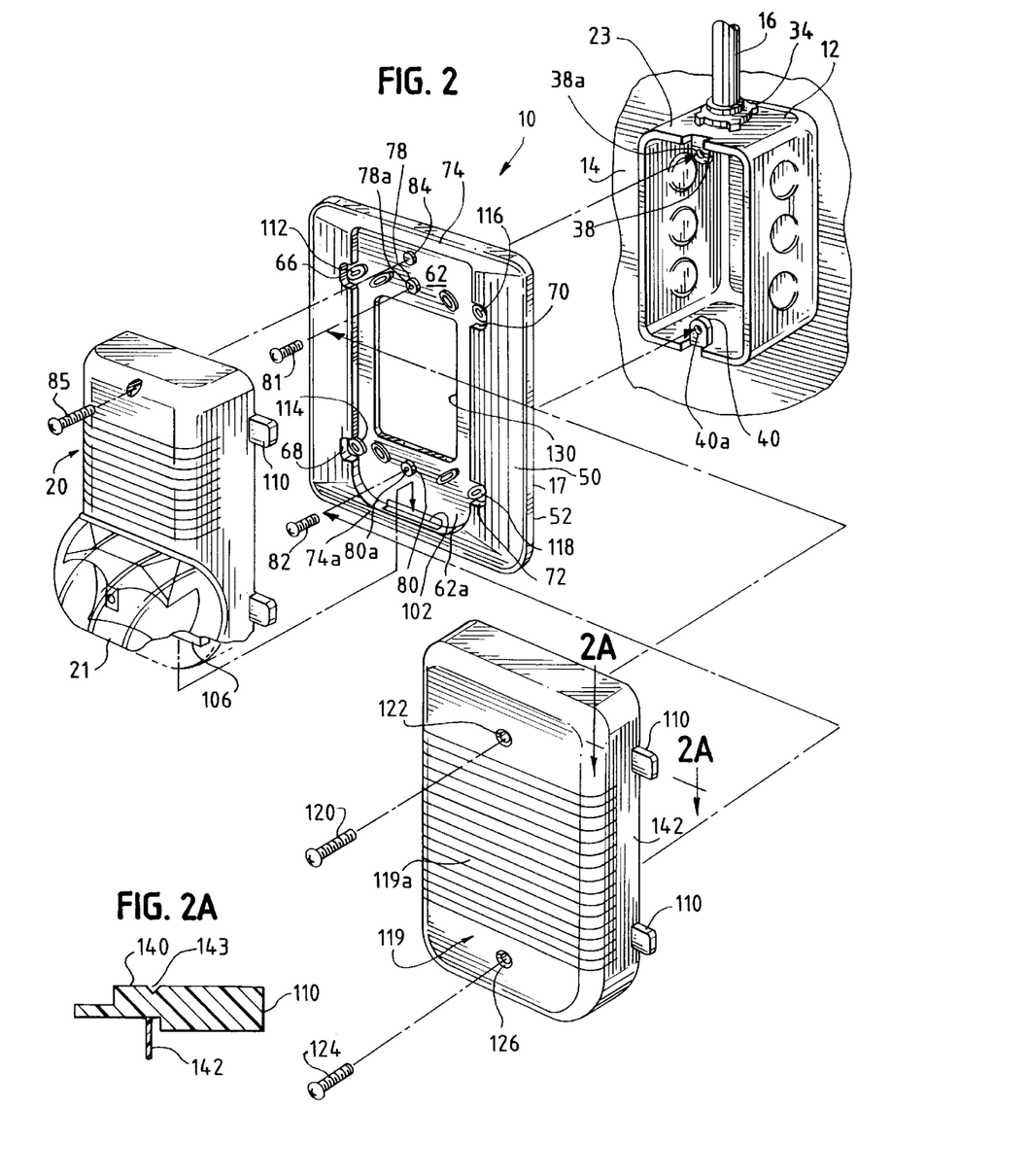
FIG. 2 is an exploded perspective view of the mounting plate to be assembled on the wall recessed junction box.
FIG. 2A is an enlarged fragmentary sectional view taken along plane 2A—2A of FIG. 2.

FIG. 2 illustrates the assembly 10 in an exploded view. The assembly 10 (components of which are described below) is installed over and onto a front face of the wall recessed junction box 12 which is installed recessed from the wall surface 14 (portions of the wall shown broken away). The surface 14 can be on a vertical wall as shown, or on a column, or a ceiling, or on any exposed surface.

The junction box 12 is connected by at least the one conduit 16 shown in FIG. 2 as connected to a top panel 23 of the junction box 12.

The conduit 16, as shown, is connected to the top panel 23 by way of a conventional, threaded two-piece conduit connector 34. Also, the box 12 provides bent-tabs 38, 40 which provide threaded screw holes 38a, 40a, therethrough for receiving screws.

Mounted to and covering an open front face of the junction box 12 is the mounting plate 17. The mounting plate 17 has a front side 50, and a back side 52. The mounting plate is preferably a one-piece, molded plastic, color coded structure.

The front side 50 includes a recessed central region 62 having four offset, smaller supplemental, recesses 66, 68, 70, 72. The recesses 66, 68, 70, 72 are arranged in a rectangular pattern and open to the recessed region 62, arranged recessed into a surrounding rim 74.

Screw supporting cylinders 78, 80 with through-holes 78a, 80a, respectively are arranged extending through the recessed region 62. The holes 78a, 80a are aligned with the screw holes 38a, 40a of the junction box 12.

Screws 81, 82 can extend through the holes 78a, 80a which have plain bores. They can be screwed into the screw holes 38a, 40a to mount the mounting plate 17 to the junction box 12. Other types of fasteners could be used for this purpose. For example, snap-fit fasteners each of which include resilient members such as ridges, or hooks, or ribs, or similar formation, can be inserted into the screw holes 39a, 40a to engage therewith.

Also mounted on the recessed region 62 is a screw engaging cylinder 84. Cylinder 84 receives a screw 85 which is threadingly engageable therein to mount the strobe light unit 20 to the mounting plate 17.

The mounting plate 17 further provides a slot 102 formed through the recessed region 62 and into the rim 74 in a direction generally parallel to a front surface 62a of the recessed region 62. The slot 102 receives a tab 106 of the strobe light unit 20. A front portion 74a of the rim 74 thus retains the tab 106 from frontward movement (see FIG. 4). The strobe light unit 20 can therefore be easily and quickly installed to the mounting plate by sliding the tab 106 into the slot 102 and inserting the screw 85 through an aperture 108 of the module 20 and threading it into the screw receiving cylinder 84 of the mounting plate 17.

The unit 20 further provides extending tab portions 110 which are arranged to inter-fit into the smaller recesses 66, 68, 70, 72 to cover oblong screw-receiving bores 112, 114, 116, 118. These bores provide an alternate means of mounting the mounting plate to a junction box as will be described in FIG. 3.

The mounting plate 17 provides a convenient mounting for a plurality of different types of alarm units. As illustrated in FIG. 2, an audible alarm unit 119 is shown which is mounted in a modified fashion. The alarm unit 119 includes a horn or audible signal generator 119a within the unit 119.

In the case of the audible alarm unit 119, a first screw 120 passes through an aperture 122 of the alarm unit 116 and passes through the cylinder 78 and threads into the screw hole 38a of the junction box. A second screw 124 passes through a second aperture 126 in the alarm unit 119, the cylinder 80 and threads into the screw hole 40a of the junction box. Either of the alarm units 20, 119, can be attached by using two screws or other type fasteners, or by using a single screw or fastener and a tab-in-slot configuration as described above.

The mounting plate 17 further includes a central opening 130 through the recessed region 62 which allows the connection of wires from the unit 20, or the unit 119, to wires within the junction box 12 from the conduit 16. The opening 130 can be made smaller than an open face of the junction box, so that if a unit 20, 119 is removed from the mounting plate, loose wires can be retained within the junction box by the mounting plate.

As shown in FIG. 2A, the tab portions 110 for both units 20, 119 are configured to be removable. The tab portions 110 extend from a back wall 140 of unit 119 (or the unit 20) outwardly of a side wall 142 thereof. The tab portion includes a back notch 143 and a front offset 144 which facilitates breaking off of the tab portions 110 when desired. The tab portions 110 are removed for the installation with the plate described below in FIGS. 9–12.

Figures 3, 4:
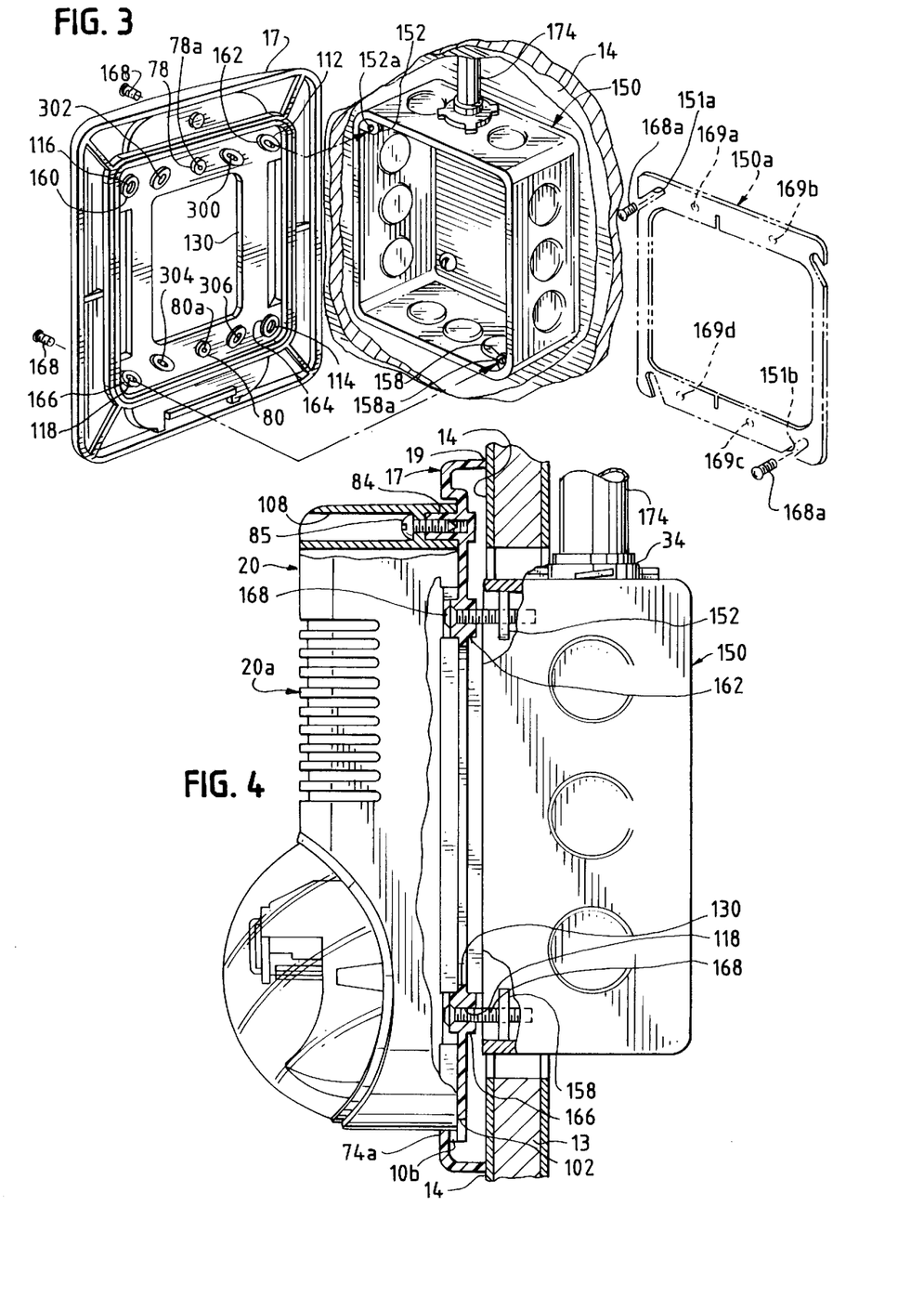
FIG. 3 is an exploded perspective view of a portion of the present invention installed on a double wide, wall recessed junction box.
FIG. 4 is a partial sectional view of the present invention installed on the wall recessed junction box shown in FIG. 3.
Figure 5:
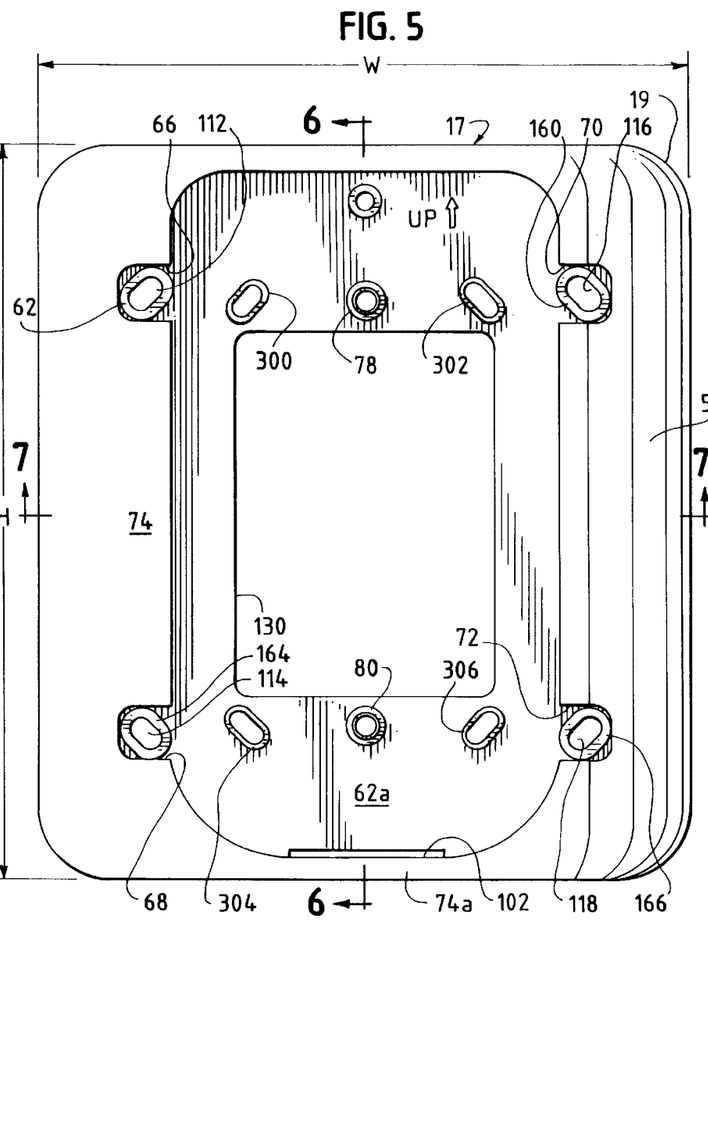
FIG. 5 is a front elevational view of the mounting plate shown in FIG. 1.
Figure 6:
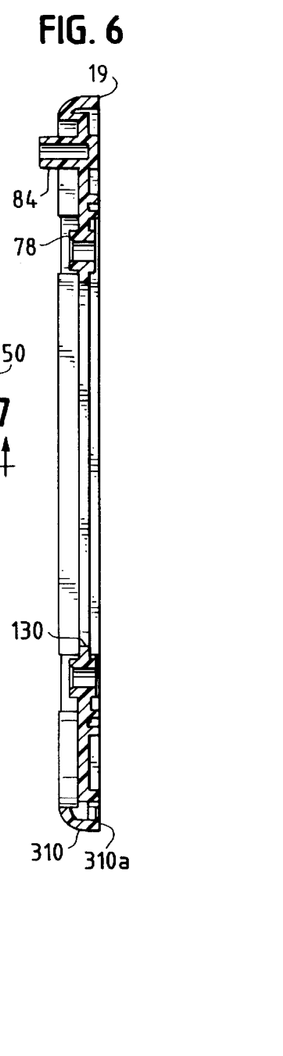
FIG. 6 is a sectional view taken generally along lines 6—6 of FIG. 5.
Figure 7:
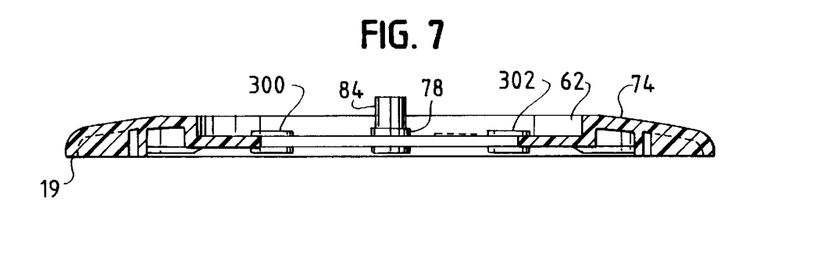
FIG. 7 is a sectional view taken generally along lines 7—7 of FIG. 5.
Figure 8:
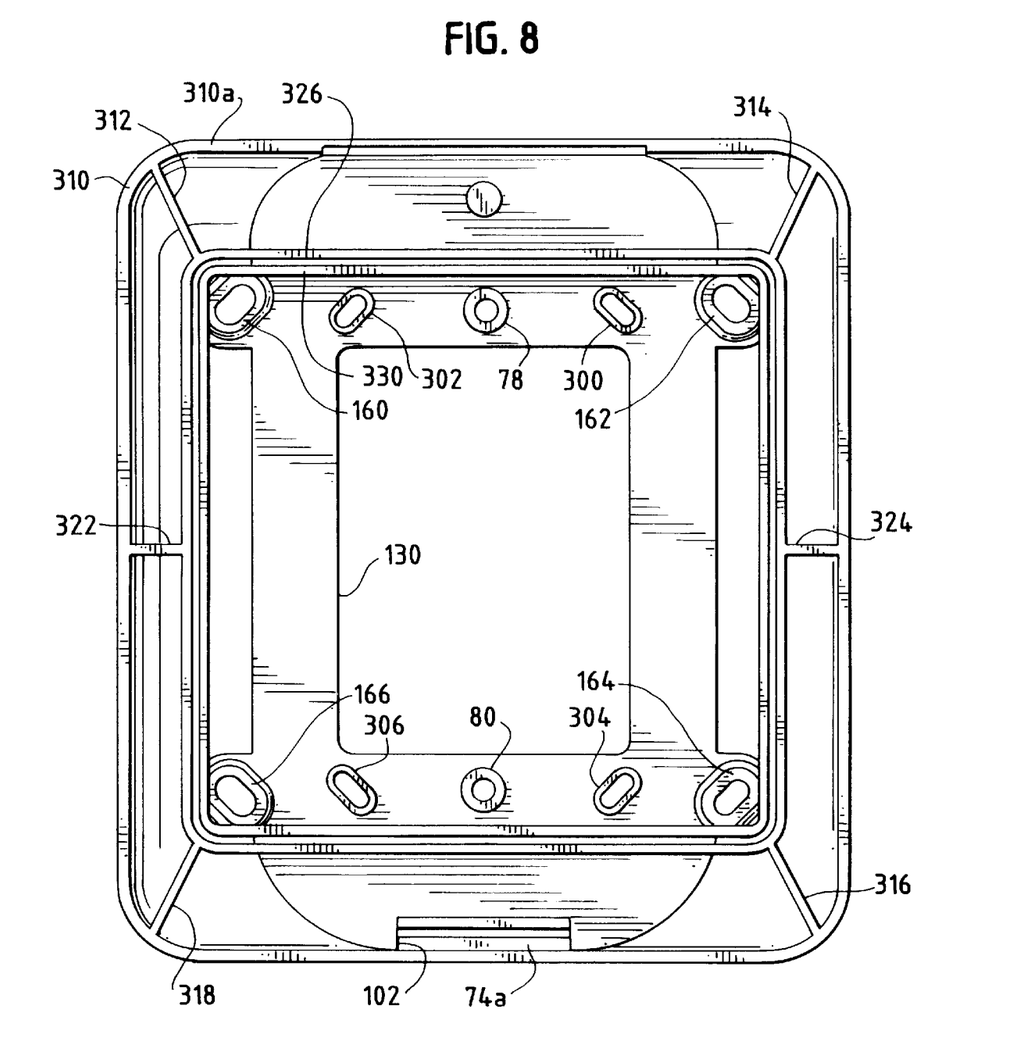
FIG. 8 is a rear elevational view of the mounting plate shown in FIG. 5.

FIG. 3 illustrates the mounting plate 17 in use with a double-wide junction box 150, a junction box which, for electrical power use, is sized to otherwise receive two electrical fixtures. Double-wide junction boxes have screw engaging holes 152*a*, 158*a* arranged at two diagonally oriented corners through bent tabs 152, 158. These holes are typically used for attaching closure plates or fixture adapters to covert the junction box for a particular use.

The oval screw holes 112, 114, 116, 118 of the mounting plate 17 are shown as being formed through oblong cylinders 160, 162, 164, 166 having plain bores, and formed on a backside of the recessed region. Two screws 168 slide through two of the oblong plain bores, and are threadingly received into the screw holes 152*a*, 158*a* to mount the cover 17 to the junction box 150. The oval screw holes 112, 114, 116, 118 allow for some angular correction of the mounting plate 17 on a vertically tilted junction box.

In general, only two screws 168 will be used. The screws are inserted through the oblong cylinders 162, 166. The oblong cylinders 160, 164 will usually not be needed unless a four-mounting-screw-arrangement electrical box is provided or if the engaging holes 152*a*, 158*a* are arranged opposite the oblong cylinders 160, 164, i.e., the junction box orientation is reversed. As stated above, alternate fasteners such as snap-fasteners can be used in lieu of the screws 168.

FIG. 3 shows in phantom a "mud shield" 150*a* which can be connected to box 150 onto and around the open front face thereof. The mud shield is only one of a variety of adapters which can be connected to the open face of the box 150 at the engaging holes 152*a*, 158*a* using slotted openings 151*a*, 151*b* and screws 168*a*. These adapters provide fixture holes 169*a*, 169*b*, 169*c*, 169*d*, located inward of sides of the junction box. The mounting plate 17 provides slanted oval holes 300, 302, 304, 306 which align with the holes 169*a*, 169*b*, 169*c*, 169*d*. The oval and slanted shape of the holes allow for aesthetic, orientation readjustment of the mounting plate given a tilted junction box.

FIG. 4 illustrates the mounting plate 17 installed onto the junction box 150 and against the surface 14. As can be observed, the mounting plate 17 covers the opening of the junction box. The mounting plate 17 is sized to cover the junction box with the surrounding edge 19 of the mounting plate 17 reaching the surface 14.

As installed, the mounting plate 17 clearly demarcates the junction box according to its service, such as fire alarm service, and can be color coded accordingly. For example, a red mounting plate can be used for a fire condition, a green mounting plate can be used for a tornado warning, and a blue mounting plate can be used for a "take cover immediately" warning. Also, a different color can be use for a warning of a high concentration of poisonous or explosive gas. The mounting plate provides an architecturally pleasing appearance.

The mounting plate 17 provides a wider and taller front surface for receiving and supporting the alarm units 20, 119 than would be otherwise provided by the electrical box 12, 150. The electrical units 20, 119 can be nested into the recessed regions 62 on the front wall 50 of the mounting plate 17. The electrical units 20, 119 do not overhang the mounting plate. Since the mounting plate 17 can be pressed against the surface 14, around the edge 19 at a distance from the attachment point of the mounting plate to the junction box, it provides a more stable and secure installation of the electrical units 20, 119 than the smaller electrical box alone.

The mounting plate 17 is significantly oversized when compared to the open face of the junction box. Advantageously the height H of the mounting plate is about 5⅝ inches and the width W is 5 inches. In comparison the height H1 of the single wide junction box is 4 inches and its width W1 is 2⅛ inches. The height H2 of the double wide junction box is 4 inches, and the width W2 is 4 inches. Thus, the mounting plate 17 overhangs the junction boxes by 13/16 on top and bottom, and by 1⅞ inches (single wide junction box) or ½ inches (double wide junction box) on the sides.

FIG. 5 through FIG. 8 illustrate in detail the construction of the mounting plate 17. The mounting plate 17 further includes the four inclined oval screw-receiving cylinders 300, 302, 304, and 306 which provide an additional attachment location for the mounting plate to an electrical box. Particularly, these locations 300–306 are useful when mounting the mounting plate 17 to a double-wide junction box with the mud shield 150*a* shown in FIG. 3. The locations 300 through 306 are located within the recessed region 62 such that the alarm unit 20, 119 mounted to plate 17 will cover these openings.

The plate includes a surrounding rim 310 adjacent to the edge 19. The surrounding rim 310 is connected by corner webs 312, 314, 316, 318 and side webs 322, 324 to a reinforcing rim 326. Concentrically located within the reinforcing rim 326 is a secondary rim 330. The surrounding rim 310 provides a surface 310*a* for pressing against the wall surface 14 when installed on a recessed electrical box. The reinforcing and secondary rims 326, 330 are arranged to reinforce the local connection areas against cracking or bending, the local connection areas being either the oval cylinders 160–166, or the secondary ovals 300–306, or the fixture mounting screw holes 78, 80.

FIGS. 9 through 12 illustrate an alternate mounting plate 417 of the present invention. This mounting plate 417 is particularly suited for a single-wide junction box and includes a screw-receiving cylinder 420 for engaging a screw 85 for holding the electronic unit such as a strobe light 20 or the audible alarm 119 to the plate 417. A slot 422 arranged on the bottom side of the plate 417 receives a tab of the electronic unit as previously described. The plate 417 includes a recessed region 430 for slidingly receiving an alarm unit. The recessed region 430 is surrounded by a rim 432.

Located in a central region of the recessed region 430 is an aperture 440 for passing wires between the mounted electronic unit 20, 199 and the electrical box. Located between the screw-receiving cylinder 420 and the slot 422 are oval cylinders 444, 446. The cylinders 444, 446 each receive a screw which connects to the fixture-receiving holes of the electrical box, such as 38*a*, 40*a*, as shown in FIG. 2. The oval shape of the cylinders 444, 446 allows for some adjustment of verticality of the mounting plate 417 with respect to the electrical box, particularly for aesthetic appearance. The plate 417 includes a surrounding rim 450 and a concentric secondary rim 452 arranged in close proximity. These rims provide a mounting surface 450*a*, 452*a* for abutting the plate 417 to the wall surface 14.

The alternate embodiment of FIGS. 9–12 can be used with the alarm units as shown in FIG. 2, the strobe light 20 and the audible alarm 119. For use with these alarms, the tabs 110 on the alarm units can be broken off easily as described in FIG. 2A. The alarm units thus having a rounded rectangular profile to fit snugly within the recessed area 430 against an inwardly directed surrounding wall surface 460. The tab 106 such as shown in FIG. 2 fits downwardly into the slot 422 and is prevented from forward retraction by a front portion 432a of the rim 432. A screw connects a top portion of the alarm unit by being threadingly engaged into the cylinder 420 as previously described.

Figure 9:
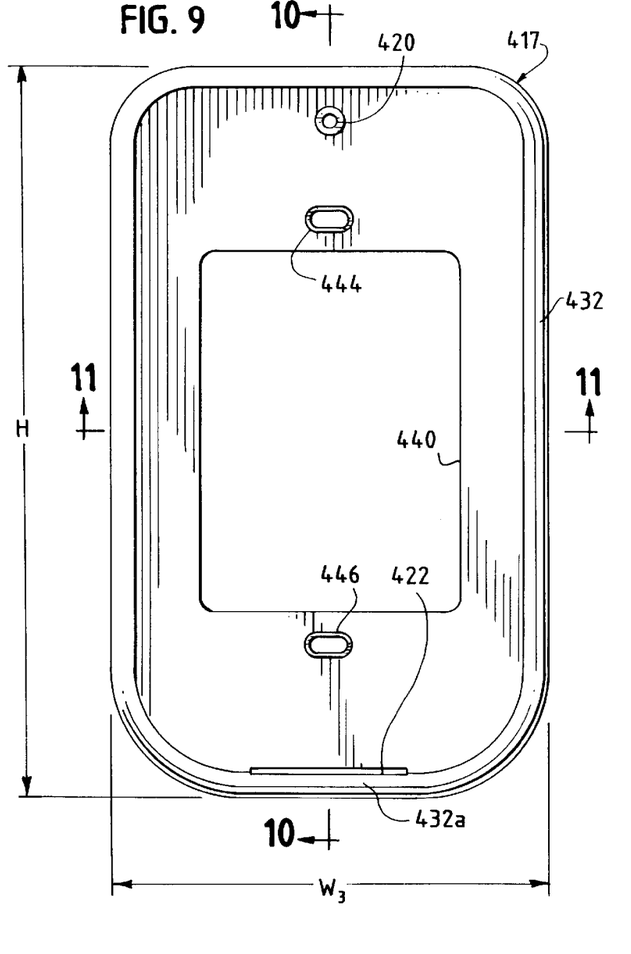
FIG. 9 is a front elevational view of an alternate mounting plate.
Figure 10:
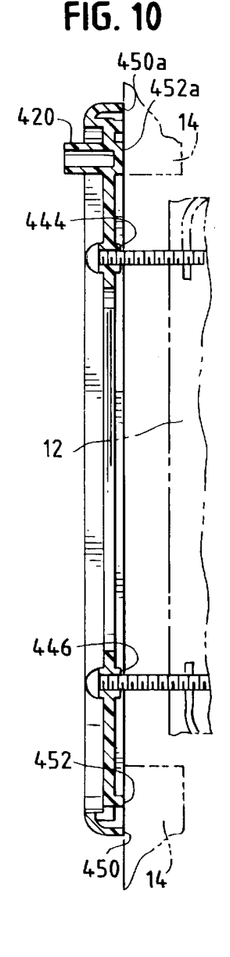
FIG. 10 is a sectional view taken generally along line 10—10 of FIG. 9.
Figure 11:
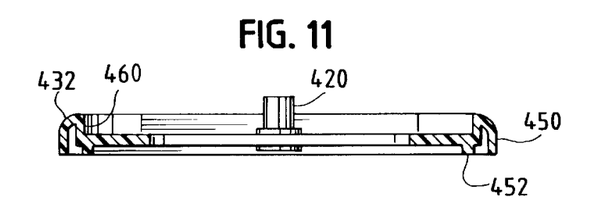
FIG. 11 is a sectional view taken generally along line 11—11 of FIG. 9.
Figure 12:
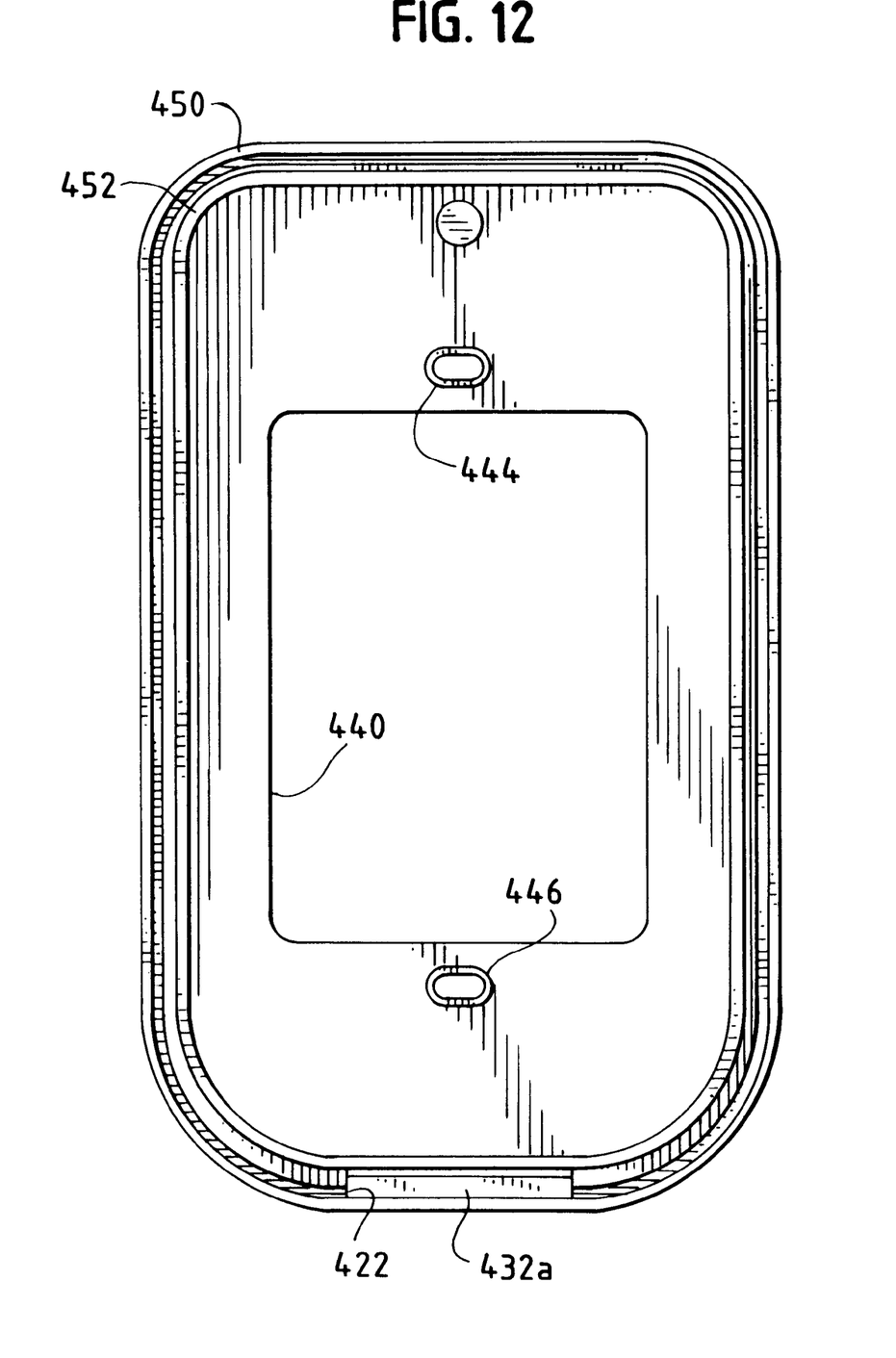
FIG. 12 is a rear elevational view of the mounting plate shown in FIG. 9.

As demonstrated in FIGS. 9 and 10, the alternate plate 417 has a height H3 of 5⅝ inches and a width W3 of about 3⅜ inches. Thus, when mounted to a single wide junction box 12, the plate overhangs the box by ¹³⁄₁₆ inches on top and bottom and by ⅝ inches on the sides.

Figure 13:
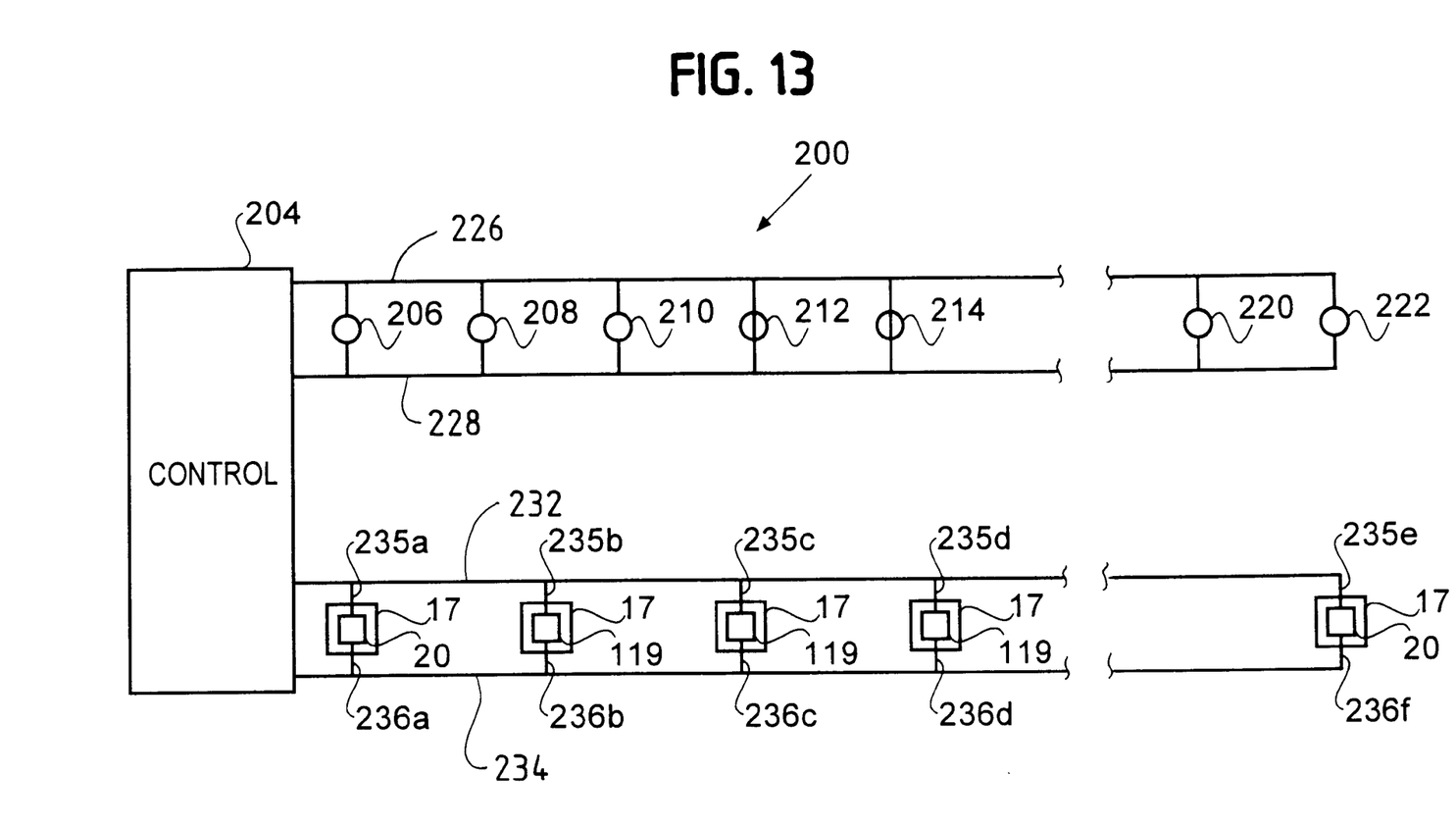
FIG. 13 is a schematic diagram of a system incorporating the mounting plates as shown in FIG. 1.

FIG. 13 illustrates an alarm system 200 for a facility such as a warehouse. The system 200 includes a control unit 204 which incorporates a common computer or control console.

A plurality of condition sensors 206, 208, 210, 212, 214, 220, 222 can be connected to electrical communication lines 226, 228. The sensors can be of one type, such as smoke detectors, or can be a plurality of different detectors, such as smoke detectors, motion sensors, etc. The sensors are advantageously spaced apart around and inside of the facility. Other types of modules can also be attached to boxes 226, 228.

A plurality of alarm units 20, 119 are connected to the control unit 204 via two alarm electrical bus lines 232, 234 and branch lines 235a–e, 236a–e. The alarm units can be a mixed assortment of the two unit types 20, 119 or all one type or can include other types as well. The bus lines 232, 234 and branch lines 235a–e, 236a–e are carried in conduits which terminate in junction boxes 12, 150 as shown, for example in FIGS. 2 and 3. The plurality of the alarm units 20, 119 can incorporate mounting plates 17 to architecturally integrate the alarm system into the facility and provide the other advantages enumerated above. The alarm units are advantageously spaced apart around the facility. The control unit 204 can transmit an alarm signal to all alarms on the bus lines 232, 234, or the bus lines can be configured so that the control unit 204 can trigger selected alarms.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A mounting plate for mounting an electronic unit to an electrical junction box having an open front face with mounting screw holes adjacent the open front face, comprising:

a wall sized to surround the open front face, and having an outer perimeter larger than an outer perimeter of the junction box in a plane of the open front face, said wall having screw-receiving holes aligned to register with the mounting screw holes of the junction box, and having an area on an exposed surface of said wall for mounting an electronic unit and;

wherein said wall includes a primary recess for receiving a body of an electronic unit in closely nesting fashion, and a plurality of smaller secondary recesses contiguous to said primary recess, and wherein each smaller, secondary recess is located over one of said screw-receiving holes.

2. The mounting plate according to claim 1, wherein said area includes at least one recess for slidingly receiving a portion of the electronic unit.

3. The mounting plate according to claim 2, wherein said recess includes an opening for passing wires from the electronic unit and the junction box.

4. The mounting plate according to claim 3, wherein said recess includes a slot and a screw receiving bore arranged to receive a tab of the electronic unit into said slot and a screw engaged to the electronic unit and into said bore.

5. The mounting plate according to claim 1, wherein said screw-receiving holes are aligned with fixture screw receiving holes of the junction box.

6. The mounting plate according to claim 1, wherein said wall comprises a recessed region for receiving a portion of an electronic unit.

7. An electrical device assembly for a wall-recessed electrical junction box, the junction box having an open front face, the assembly comprising:

a mounting plate mountable to a wall surface and connectable to a wall-recessed electrical junction box and sized with an outside profile to be flush with said wall surface, said mounting plate having a wall member and an opening through said wall member, and fastener receiving holes; and an electrical device supported on said wall member and covering said opening, said electrical device having electrical connections which are connectable through said opening;

wherein said electrical device and said wall member include mutually engaging locators for aligning said electrical device onto said wall member, and wherein said locators comprise recesses in said wall member and tab portions on said electrical device which engage said recesses, and wherein said fastener-receiving holes of said mounting plate are located within said recesses and wherein said tab portions cover said faster-receiving holes.

8. The assembly according to claim 7, wherein the junction box includes fixture mounting screw holes adjacent to the open front face of the junction box, and wherein said mounting plate has screw-receiving holes aligned to register with the fixture mounting screw holes of the junction box, the screw-receiving holes and the fixture mounting screw holes for receiving a plurality of screws for mounting the mounting plate to the junction box.

9. The assembly according to claim 7, wherein the mounting plate comprises a molded plastic structure.

10. The assembly according to claim 9, wherein the mounting plate comprises a generally planar configuration.

11. The assembly according to claim 7, wherein said electrical device is mounted to said wall member by at least one screw, wherein said wall member comprises a screw-receiving and engaging region for receiving said screw.

12. The assembly according to claim 7, wherein said electrical device is connected to said wall member by at least one screw and said electrical device includes a retaining tab, and said wall member includes a slot for receiving said retaining tab.

13. The assembly according to claim 12, wherein said retaining tab extends from a bottom wall of said electrical device outwardly in a direction generally parallel to said wall member; and said front wall includes a recess for receiving said tab, said slot being open to said recess and oriented to receive said tab in a direction generally parallel to said wall member.

14. The assembly according to claim 13, wherein said mounting plate is substantially composed of an electrical insulating material.

15. The assembly according to claim 7, wherein said electrical device includes a lamp for illuminating an area surrounding said electric device.

16. The assembly according to claim 7, wherein said electrical device includes an audible signal generator.

17. An electrical unit mounting system mountable to an electrical box, the system comprising:
 a mounting plate with a front side with a depressed body-receiving region for selected shape formed therein;
 elements for attaching the mounting plate to the electrical box wherein when so attached, the mounting plate substantially covers an open face of the box; and
 an electrical unit having a body slidably-receivable, at least in part, in the body-receiving region wherein the electrical unit is carried, at least in part, by the mounting plate, said electrical unit including plural tab portions which extend outwardly therefrom and which are connected to said body with breakable connections, wherein said tab portions are selectively removable to enable said electrical unit to match said shape of said body-receiving region.

18. The mounting system according to claim 17, wherein said electrical box includes at least one fixture-mounting screw hole, and, said elements comprise at least one snap-fit fastener member which engages said screw hole by forcing sliding insertion of a portion of said fastener member through said screw hole.

19. The mounting system according to claim 17, wherein the electrical box includes fixture mounting screw holes, and said elements include screws located in screw-receiving holes alignable with fixture-mounting screw holes of the electrical box; and
 said electrical unit covers said screw-receiving holes when said electrical box is slid into said body-receiving region.

20. The mounting system according to claim 19, wherein said plural tab portions include four tab portions, and said body-receiving region comprises a generally rectangular recess with four adjacent recesses arranged in a rectangular pattern therearound and which open into said rectangular recess, said screw-receiving holes arranged within said four adjacent recesses, and said rectangular pattern at least partially matching a layout of fixture mounting screw holes of the electrical box; and wherein
 said tab portions extending therefrom which fit into said adjacent recesses to cover said screw-receiving holes, when said electrical unit is slid into said body-receiving region.

21. The mounting system according to claim 17, wherein the electrical box includes mounting screw holes, and said elements include screw-receiving holes alignable with mounting screw holes of the electrical box; and said electrical unit includes unit-mounting screw holes aligned with said screw-receiving holes; and screws which are placed through said unit-mounting screw holes and said screw-receiving holes and engage said mounting screw holes to mount said electrical unit and mounting plate to said electrical box.

22. An alarm system comprising:
 a control unit;
 a plurality of alarm units each having a body and outwardly extending tab portions;
 a plurality of electrical boxes each having an open front face;
 a plurality of branch conduits, each connected to one of said boxes;
 wires terminating in said electrical boxes and carried within said branch conduits, wherein said wires are connected to said control unit and said alarm unit; and
 a plurality of mounting plates each having a wall member, wherein said mounting plates are mounted onto wall surfaces over said electrical boxes to at least partially cover said front faces of said electrical boxes with said wall members, and wherein one alarm unit is mounted to each of said mounting plates, each said wall member connected to one electrical box at plural connection locations, each of said wall members having a recessed region for receiving the body of one of said one alarm units, said recessed region having adjacent contiguous recesses, one contiguous recess being located at each connection location and arranged to receive one of said tab portions.

23. The system according to claim 22, wherein each of said wall members includes a surrounding edge and each of said wall members is sized to have said surrounding edge flush with a surface which carries a respective electrical box recessed therein, the respective electrical box when said mounting plate is mounted to said respective electrical box.

24. The system according to claim 22, wherein said plurality of alarm units include audible alarms and strobe light alarms.

25. The system according to claim 22, wherein said alarm units comprise first alarm units and second alarm units for two different emergency services respectively, and said plurality of mounting plates corresponding to said first and second alarm units are color coded a first color and a different second color respectively, corresponding to the emergency service.

26. The system according to claim 25, wherein the two emergency services are selected from the group consisting of: fire alarm, tornado alarm, and take cover immediately alarm.

27. In an electrical unit mounting system associated with a structure, the system at least one communication link coupled thereto, a plurality of electrical boxes, including single wide and double wide boxes, connected to the link, the system comprising:
 a plurality of mounting plates, including single wide plates and double wide plates, wherein each mounting plate is adapted for mounting to one member of the plurality of electrical boxes using fasteners, each of said mounting plates sized to close an open front face of the plurality of electrical boxes, each of said mounting plates having a gap for passing an electrical conductor therethrough; and
 a plurality of electrical units, each electrical unit adapted for mounting to one of said mounting plates, each electrical unit including a body having outwardly extending tab portions, each tab portion connected to the body by a break away connection, said tab portions arranged for covering the fasteners which connect double wide plates to double wide boxes, and wherein said tab portions are removable to mount an electrical unit to a single wide plate, said electrical unit being electrically connectable to the link through said gap of said one of said mounting plates.

28. The system according to claim 27, wherein each of the electrical boxes are recessed behind a respective wall surface, and each of said mounting plates is mounted flush against said respective wall surface.

29. The system according to claim 28, wherein each of the electrical boxes includes mounting holes, and each of said plurality of mounting plates includes fastener receiving holes aligned with respective mounting holes in one of said electrical boxes, for mounting a respective mounting plate to said one of said electrical boxes.

30. The system according to claim 27, wherein said plurality of electrical units includes audible alarm units and visual alarm units.

31. A cover for an electrical box, comprising
a wall member having a height and width greater than a height and width of an electrical box connected thereto;
said wall member having a central recess and a plurality of adjacent, offset supplemental recesses, said central recess adapted for receiving a body portion of an electric device, each of said offset supplemental recesses having a screw-receiving hole located therein, and said offset supplemental recess adapted for receiving tab portions of the electrical device for overlying said screw-receiving holes, said screw-receiving holes adapted for screw-mounting said wall member to an electrical box.

32. The cover according to claim 31, wherein said wall member is molded of a plastic having a selected pigment.

33. The cover according to claim 32, wherein said pigment is selected according to a pre-selected service of an electric device carried by said wall member.

* * * * *